Patented July 7, 1931

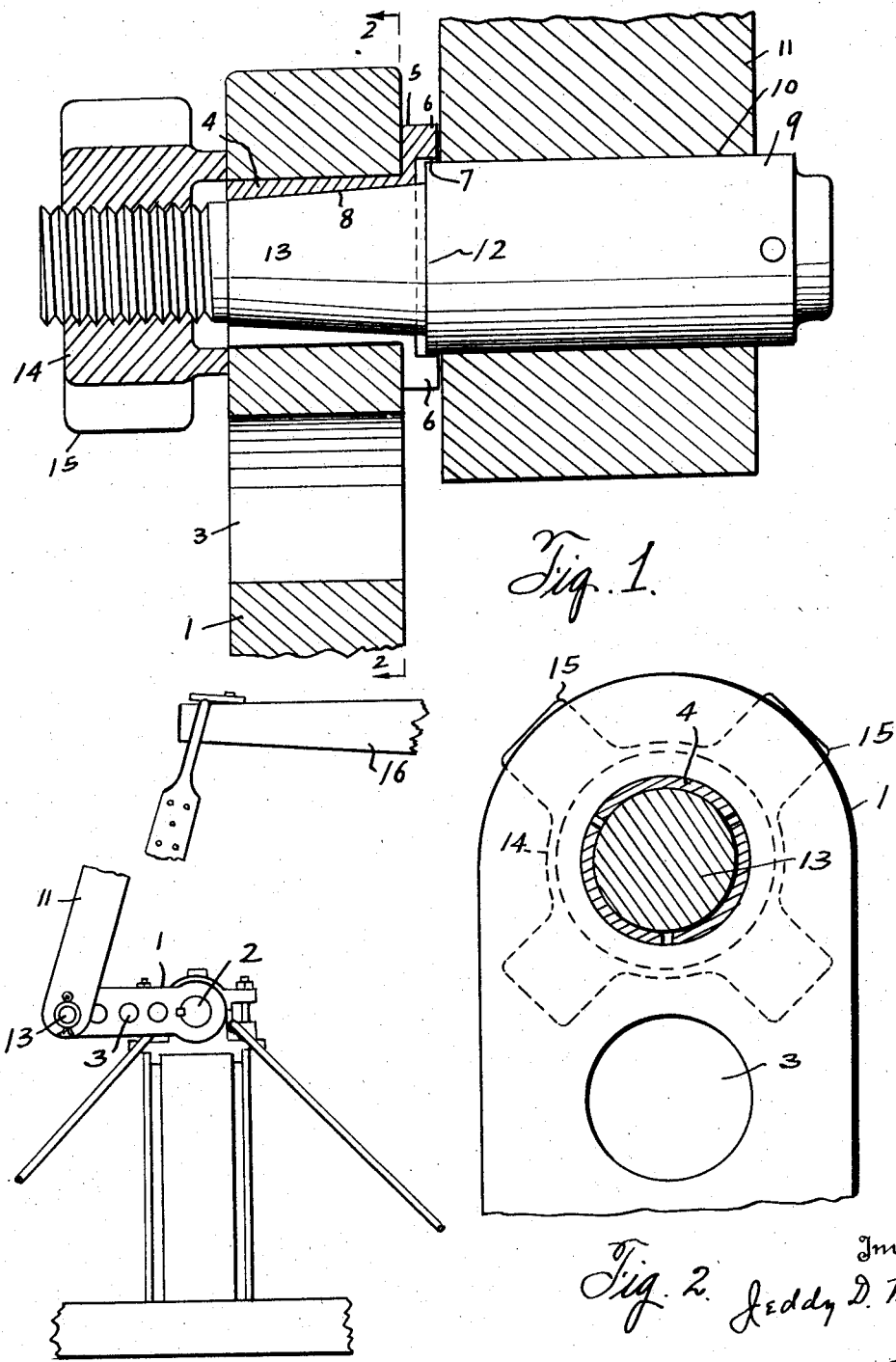

1,813,193

UNITED STATES PATENT OFFICE

JEDDY D. NIXON, OF HOUSTON, TEXAS

WRIST PIN

Application filed March 26, 1929. Serial No. 349,966.

This invention relates to new and useful improvements in a wrist pin.

One object of the invention is to provide a novel type of wrist pin and means for securely attaching the same to a conventional type of crank arm.

Another object of the invention is to provide a wrist pin of the character described which may be securely attached to a crank arm, and which at the same time may be easily removed from or adjusted on said arm.

With the above and other objects in view this invention has particular relation to certain novel features of construction, operation and arrangement of parts an example of which is given in this specification and illustrated in the accompanying drawings, wherein:—

Figure 1 shows a side elevation of the wrist pin, shown assembled with the crank arm and pitman, said arm and pitman, and the wrist pin bushing and clamp nut being shown in section.

Figure 2 shows a transverse sectional view taken on the line 2—2 of Figure 1, and Figure 3 shows a fragmentary side view of a pumping unit embodying the wrist pin and illustrating the use for which it has been specially designed.

Referring now more particularly to the drawings, wherein like numerals of reference designate similar parts in each of the figures the numeral 1 designates a crank arm which is fixed to a suitable driving shaft 2. This arm has a plurality of bearings 3 spaced apart therealong. There is a sectional bushing 4 whose outside diameter is equal to the inside diameter of the bearings 3. One end of the bushing has an annular flange 5 which has an outstanding marginal rib 6 all the way therearound thus providing a socket 7. The bearing 8 formed by said bushing converges, or tapers, from the flange to the other end of the bearing.

There is a wrist pin 9 provided to receive the bearing 10 of a pitman 11. One end of this pin is reduced forming an external annular shoulder 12 and a reduced and outwardly tapered shank 13. This tapering shank fits through the bearing 8 of the bushing, hereinbefore referred to snugly, and the outer end of the shank 13 extends beyond the crank arm and is exteriorly threaded to receive a winged clamp nut 14 which is provided with the radial wings 15.

When the shank 13 is inserted through the bearing 8 the nut may be screwed onto the threaded end thereof and will clamp against the adjacent side of the crank arm to draw the shank through the said bearing, spreading the sections of the bushing until the shank is firmly seated therein. There is a sufficient clearance between the shoulder 12 and the bottom of the socket 7 to permit the shank to be tightened up from time to time, when it becomes loose, by tightening up the nut 14. The wings 15 of this nut are made sufficiently strong so that a hammer may be used for tightening up the nut without injury thereto.

The pitman, as shown, is also connected to the walking beam 16, of a conventional pumping unit for operating the same.

In order to vary the stroke of the walking beam, as is necessary from time to time, the walking beam has a plurality of similar bearings 3, spaced at unequal distances from the axis of rotation of said arm; and the pin 9 may, by releasing the nut 14, be readily adjusted to the bearing 3 which will give the desired stroke and be easily and securely mounted in the selected bearing.

What I claim is:—

1. The combination with a crank arm wrist pin having a shank which is tapered and whose free end is externally threaded, of an expansible bushing adapted to fit through the crank arm, and having a tapered bearing therethrough to receive said shank snugly, an outward extension on one end of said bushing and a clamp nut on the threaded end of said shank, said nut and flange being spaced apart to clamp the crank arm between them.

2. The combination with a wrist pin having a reduced shank which is tapered and whose free end is externally threaded, of an expansible bushing having a tapered bearing therethrough to receive said shank snugly, an external annular flange on one end of said bushing provided with a socket, said wrist-pin having an external annular shoulder arranged to fit into said socket and a clamp nut on the threaded end of the pin.

3. The combination with a crank arm having a bearing, of a bushing fitted through said bearing and having a tapering bearing, a wrist pin one end of which is reduced forming an external shoulder and a tapering shank, said shank being formed to fit snugly in said tapering bearing, an external annular flange on one end of the bushing which is adapted to fit closely against one side of said arm and is formed with a socket to receive said shoulder, the free end of the shank being externally threaded, a clamp nut on said threaded end which clamps against the other side of said arm.

4. The combination with a crank arm having a bearing, of a bushing fitted through said bearing and having a tapering bearing, a wrist pin one end of which is reduced forming an external shoulder and a tapering shank, said shank being formed to fit snugly in said tapering bearing, an external annular flange on one end of the bushing which is adapted to fit closely against one side of said arm and is formed with a socket to receive said shoulder, the free end of the shank being externally threaded, a clamp nut on said threaded end which clamps against the other side of said arm, said bushing and flange being formed of lengthwise sections.

5. A device of the character described comprising a wrist pin having a reduced shank which is outwardly tapered and whose free end is threaded, an expansible bushing having a tapered bearing therethrough to receive said shank snugly, an external outwardly extending flange on one end of said bushing and a clamp nut on the threaded end of said shank adjacent the other end of the bushing.

6. A crank arm wrist pin having an outwardly tapered shank whose free end is threaded, an expansible bushing, shaped to be fitted through a bearing in said arm and having a tapered bearing therethrough to receive said shank snugly, an external outward extension on one end of said bushing and a clamp nut on the threaded end of said shank, said extension and nut being spaced apart to engage opposite sides of said arm.

In testimony whereof I have signed my name to this specification.

JEDDY D. NIXON.